Oct. 5, 1965  T. H. SCHORR  3,209,463

SCREW THREAD GAGE

Filed July 31, 1963

INVENTOR.
THEODORE H. SCHORR

BY *Harry R. Lubcke*
AGENT

3,209,463
SCREW THREAD GAGE
Theodore H. Schorr, Los Angeles, Calif. (% Plastic Model Engineering Co., 14530 Arminta St., Van Nuys, Calif.)
Filed July 31, 1963, Ser. No. 298,933
5 Claims. (Cl. 33—199)

My invention relate to screw thread gaging and more particularly to what may be termed a lay-in type of gage.

A screw thread gage is preferably quick and reliable in use, also simple, rugged and inexpensive.

The known multiple leaf type gage requires careful "sighting" between the threads and the gage to determine correspondence and it is relatively expensive to manufacture. Any type of gauge which requires the unknown threaded element to be screwed into a nut-like aperture is time consuming in use and may not give accurate identification when only a few threads may be engaged between the unknown and the gauge.

I have formed a new gage comprised of a body having at least one surface with a plurality of approximately semicircular cavities extending into the body from the surface. Each cavity is threaded its entire length. It is seen that a screw, bolt or stud may be laid into such a cavity and if the diameter and the threads-per-unit-length (as threads-per-inch) are the same for both, there will be a secure fit between the two. This can be sensed by feel alone, the use of sight being only convenient to accomplish initial alignment, etc. Thus, the gage is quick and reliable in use.

The body may be formed of one piece of plastic or metal by molding methods. A typical shape is that of a rectangular parallelepiped, hollow, and with one surface missing so that a piece of relatively uniform thickness may be easily molded. Another shape is the same arrangement of opposed surfaces curved around into an annular configuration, or a U shaped configuration.

Typically, the diameter and the threads-per-unit-length information is displayed closely adjacent to the corresponding cavity so that the user, after having established a fit between his sample and a particular cavity, is immediately informed as to its characteristics.

An object of my invention is to provide a thread gage that is quick to use.

Another object is to provide a thread gage with which the diameter and the threads-per-unit-length of the unknown item are easily determined by the "feel" of the fit of the item within the gage.

Another object is to provide a thread gage having only one part.

Another object is to provide a thread gage that is rugged and light in weight.

Another object is to provide a thread gage that its inexpensive to manufacture.

Other objects of my invention will became apparent upon reading the following detailed specification and upon examining the accompanying drawings, in which are set forth by way of illustration and example typical embodiments of my invention.

Figure 1:
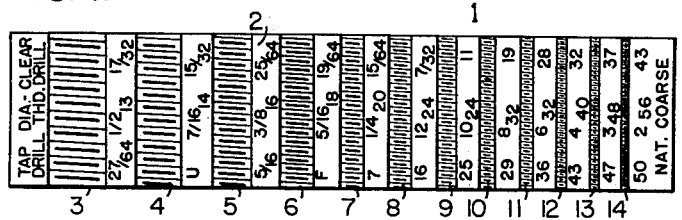
Figure 2:
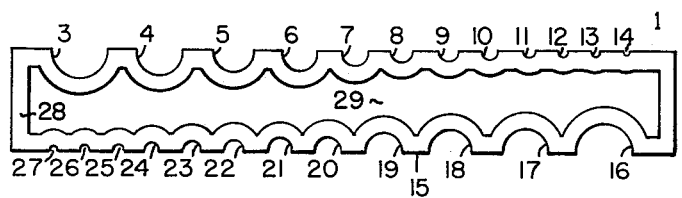
Figure 3:
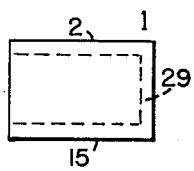
Figure 5:
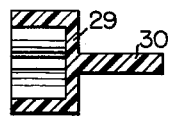
Figure 4:
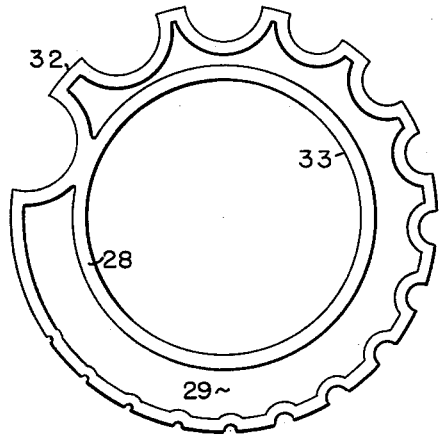

FIG. 1 shows a plan view of the rectangular parallelepiped embodiment of the gage, FIG. 2 shows a side elevation view of the same, FIG. 3 shows an end elevation of the same, FIG. 4 shows a side elevation view of an annular embodiment of the gage, and FIG. 5 shows a sectional end elevation of a fin type modification of either of the two prior embodiments of the gage.

In FIG. 1 numeral 1 indicates generally the body of the thread gage. It has an upper surface 2 from which cavities 3 through 14 enter downward into the body. It is seen in FIG. 2 that each cavity has a semi-circular form. This gives a "half-in, half-out" appearance in the relation between the unknown item and the gage which assists in accuracy of determining the diameter of the unknown. Where this might not be important each cavity may be less than semicircular. However, more than semicircular is not advisable, in that the "lay-in" feature is not possible between the unknown and the gage.

Ordinarily, each of the cavities 3 through 14 have a different diameter and a different number of threads per inch and the series follows a recognized standard, such as the United States National Coarse. In the embodiment shown a range of sizes from #2 to ½" in diameters is shown, with the number of threads per inch ranging from 56 to 13, the largest diameter being shown at the left.

Preferably, but not necessarily, a similar series of cavities is formed on the lower surface of body 1; surface 15. These are cavities 16 through 27, as seen in FIG. 2. This series may be the National Fine standard, extending from ½" diameter 20 threads to size #2 diameter 64 threads. Alternately, a greater number of one series may occupy both sides of the gage. Also, the gage may be formed for all metric threads, or for metric on one surface and English on the other.

Although the gage can be machined from stock, it is preferably manufactured by a molding process. It is then preferably formed relatively hollow, in which the material of the body takes the form of an all-extensive web 28. This produces a gage that is light in weight and one which does not require very much material, an aspect of economy. As has been mentioned, the planar surface which would complete the true parallelepiped is missing at the front of FIG. 2. The gage is hollow and only the rear web 29, shown in several figures, holds the body rigidly together.

I prefer to mold the gage of a high grade of styrene, such as acrylic modified styrene or high impact styrene. Such materials have strength and toughness and wear well. Nylon may also be used as a superior but more expensive material. Also, die cast metal may be used, such as known zinc or aluminum alloys, or a thermoset material, such as the phenolic Bakelite.

In forming the mold it is desirable to employ matched machined steel cavities for the threaded top and bottom surfaces, and a side core, air actuated in the die block, to accomplish the hollow portion of the body.

In addition to the basic information of thread diameter and pitch it is also possible to list ancillary information, such as tap drill and clearance drill sizes. These are shown in FIG. 1. An increase in width over that required for proper matching of the threads is required for this ancillary information. Without this, the gage may be about half as wide as shown in FIG. 1.

In the modification shown in FIG. 5 ancillary information can be carried on a fin 30, which extends perpendicularly away from web 29. With a web on only one side the heads of bolts are not interfered with when placing the threaded shank in a cavity.

In the annular form of the gage shown in FIG. 4 one set of threaded cavities is provided on the outer periphery 32 and typically but not necessarily another set on the inner circumference 33. The hollow structure of the prior linear type gage is preferably retained, in which case FIG. 5 depicts the sectional view of the fin alternate for either the linear or the annular type gage. In the latter type it will also be understood that the threaded cavities may be radially disposed upon opposite lateral surfaces of the ring.

The width of the gage, as well as the length, may be varied considerably to accommodate a wide range of conditions as long as three or more threads are provided for the most coarse thread on the gage.

It is preferable on two-sided gages to arrange the small diameter cavities on one side opposite the large diameter cavities on the other side so that a relatively "balanced" structure will be provided.

Still other modifications may be made in the arrangement, size, proportions and shape of the illustrated embodiments shown without departing from my invention.

Having thus fully described my invention and the manner in which it is to be practiced, I claim:

1. A lay-in screw thread gage comprising;
    (a) a body in the form of an annular ring having at least one surface,
    (b) a plurality of approximately semicircular threaded cavities of selected sizes extending into said body from said surface, and
    (c) a written designation of the characteristic of each of said threaded cavities disposed adjacent thereto.
2. The thread gage of claim 1 in which;
    (a) said annular ring has threaded cavities on opposite surfaces thereof.
3. A lay-in screw thread gage comprising;
    (a) a body having one surface and another surface,
    (b) a plurality of approximately semicircular threaded cavities of selected sizes extending into said body from said surface,
    (c) a fin extending from said other surface in a plane approximately parallel to said one surface, and
    (d) information ancillary to each threaded cavity disposed upon said fin adjacent to said cavity.
4. The thread gage of claim 3 in which;
    (a) the ancillary information includes the diameter of the tap drill and the clear drill pertinent to each said cavity.
5. A lay-in screw thread gage comprising;
    (a) a body having two opposed surfaces,
    (b) a plurality of approximately semicircular cavities of related characteristics extending into said body from each of said surfaces, each of said cavities having a selected diameter uniform throughout the length thereof,
    (c) a thread of one selected pitch extending throughout the length of each of said cavities, and
    (d) a written designation of the characteristic of each of the threaded cavities disposed adjacent thereto.

References Cited by the Examiner

UNITED STATES PATENTS

| 447,475 | 3/91 | Pomeroy | 33—201 |
| 1,438,681 | 12/22 | Bath | 33—178 |
| 2,317,925 | 4/43 | Lewis | 33—174 |
| 2,715,280 | 8/55 | Kish | 33—174 |
| 2,733,513 | 2/56 | Gatineau | 33—174 |
| 2,830,380 | 4/58 | Rumonoski | 33—199 |
| 3,044,530 | 7/62 | Jones | 33—199 X |

FOREIGN PATENTS 102,573  12/16  Great Britain.

OTHER REFERENCES

"Styrene Nut, Bolt Gauge," Plastics World, January 1953.

ISAAC LISANN, *Primary Examiner.*
ROBERT B. HULL, *Examiner.*